(12) United States Patent
Hayashi

(10) Patent No.: US 6,995,538 B2
(45) Date of Patent: Feb. 7, 2006

(54) ROTATIONAL DIRECTION DETECTING APPARATUS FOR A THREE-PHASE BRUSHLESS DC MOTOR

(75) Inventor: Yoshitaka Hayashi, Oobu (JP)

(73) Assignee: Denso Corporation, Kariya (JP)

( * ) Notice: Subject to any disclaimer, the term of this patent is extended or adjusted under 35 U.S.C. 154(b) by 176 days.

(21) Appl. No.: 10/356,478

(22) Filed: Feb. 3, 2003

(65) Prior Publication Data

US 2003/0151383 A1 Aug. 14, 2003

(30) Foreign Application Priority Data

Feb. 8, 2002 (JP) ..................... 2002-032159

(51) Int. Cl.
*G05B 1/06* (2006.01)

(52) U.S. Cl. .............. 318/661; 318/138; 318/254; 318/439; 318/430; 318/432; 318/434; 318/654; 318/601; 318/605; 318/700

(58) Field of Classification Search ............... 318/138, 318/254, 439, 661, 654, 700, 702, 720, 721–724, 318/601, 605, 430–434
See application file for complete search history.

(56) References Cited

U.S. PATENT DOCUMENTS

| | | | |
|---|---|---|---|
| 4,441,061 A * | 4/1984 | Yoshida et al. ............ | 388/814 |
| 4,760,316 A * | 7/1988 | Hedlund .................... | 318/254 |
| 4,795,954 A * | 1/1989 | Sakurai et al. ............ | 318/661 |
| 4,837,492 A * | 6/1989 | Kurosawa et al. ......... | 318/661 |
| 4,967,122 A * | 10/1990 | Rees ......................... | 318/254 |
| 4,983,895 A * | 1/1991 | Koharagi et al. ........... | 318/254 |
| 5,057,753 A * | 10/1991 | Leuthold et al. ........... | 318/254 |
| 5,298,839 A * | 3/1994 | Takeda ....................... | 318/254 |
| 5,332,955 A * | 7/1994 | Hopper ....................... | 318/632 |
| 5,426,354 A * | 6/1995 | Bausch ....................... | 318/254 |
| 5,475,290 A * | 12/1995 | Tani et al. .................. | 318/434 |
| 5,493,188 A * | 2/1996 | Yoshikawa et al. ......... | 318/254 |
| 5,543,696 A * | 8/1996 | Huggett et al. ............. | 318/590 |
| 5,710,509 A * | 1/1998 | Goto et al. ............ | 324/207.25 |
| 5,717,299 A * | 2/1998 | Inagaki et al. .............. | 318/254 |
| 5,739,649 A * | 4/1998 | Akao .......................... | 318/139 |
| 5,760,359 A * | 6/1998 | Nakano et al. ............. | 318/603 |
| 5,867,023 A * | 2/1999 | Karagiannis et al. .. | 324/207.25 |
| 5,929,576 A | 7/1999 | Yasohara et al. | |
| 6,196,650 B1 * | 3/2001 | Inagaki ....................... | 318/439 |
| 6,522,097 B2 * | 2/2003 | Fujimoto et al. .......... | 318/605 |
| 2002/0172509 A1 | 11/2002 | Kameya et al. | |

FOREIGN PATENT DOCUMENTS

| | | |
|---|---|---|
| FR | 2 824 968 | 11/2002 |
| JP | 11-187690 A | 7/1999 |
| JP | A 2001-18819 | 1/2001 |
| JP | 2001-211698 A | 8/2001 |
| JP | A 2002-67988 | 3/2002 |
| JP | 2003-235285 * | 8/2003 |
| JP | 2003-236285 * | 8/2003 |
| WO | WO 01/20343 | 3/2001 |
| WO | WO 01/22567 A1 | 3/2001 |

OTHER PUBLICATIONS

U.S. Appl. No. 09/928,365, filed Aug. 14, 2001, Amakusa et al.

* cited by examiner

*Primary Examiner*—Marlon Fletcher
*Assistant Examiner*—Tyrone Smith
(74) *Attorney, Agent, or Firm*—Oliff & Berridge, PLC

(57) ABSTRACT

A region judging circuit judges an electric angle region of a three-phase brushless DC motor based on an output signal of a resolver. A latch timing output circuit determines an optimum latch timing. A driving direction judging circuit judges a rotational direction of the motor based on a comparison in largeness between a pair of phase currents. A latch circuit latches a judgement result of the driving direction judging circuit at the latch timing designated by the latch timing output circuit and retains the judgement result until the next latch timing comes.

2 Claims, 3 Drawing Sheets

ROTATIONAL DIRECTION DETECTING APPARATUS FOR A THREE-PHASE BRUSHLESS DC MOTOR

BACKGROUND OF THE INVENTION

This invention relates to a rotational direction detecting apparatus for a three-phase brushless DC (i.e., direct-current) motor.

A three-phase brushless DC motor is simple in mechanical structure and excellent in controllability and is therefore preferably used in the CPU controls performed in numerous motor driven apparatuses such as a motor-driven power steering device. According to this kind of three-phase brushless DC motor used for various CPU controls, it is desirable to promptly detect any malfunction or failure of CPU when it occurs.

To satisfy such a desire, the Japanese Patent Application Laid-open No. 13-018819(2001) proposes providing a sub CPU which monitors the performance of a main CPU used for controlling a three-phase brushless DC motor. However, according to this prior art, the circuit arrangement and the software used for a control system tend to be complicated due to necessity of incorporating a plurality of CPUs into this control system.

Furthermore, compared with an ordinary hardware logic circuit, the CPU is weak against electromagnetic noises and accordingly has the tendency of causing malfunctions and failures at higher probabilities. Thus, when a monitoring CPU is additionally provided, it is then necessary to provide an effective countermeasure for preventing the failure of this kind of sub CPU.

SUMMARY OF THE INVENTION

In view of the above-described problems of the prior art, the present invention has an object to provide a three-phase brushless DC motor control apparatus which is capable of detecting an actual rotational angle of the three-phase brushless DC motor with a simple circuit arrangement.

In order to accomplish the above and other related objects, the present invention provides a rotational direction detecting apparatus for a three-phase brushless DC motor, including current sensors for detecting current values flowing across two of three-phase windings of the three-phase brushless DC motor. A comparing means is provided for comparing two current values detected by these current sensors. A rotational angle detecting means is provided for outputting a signal representing a rotational angle of the three-phase brushless DC motor. A timing judging means is provided for judging a latch timing based on the rotational angle detected by the rotational angle detecting means so that a compared result produced from the comparing means reflects a correct rotational direction. And, a latch means is provided for inputting the compared result obtained from the comparing means at the latch timing based on an output signal of the timing judging means as a signal representing a rotational direction of the three-phase brushless DC motor, and for retaining the detected rotational direction until the next latch timing comes.

Preferably, the rotational angle detecting means includes a resolver generating two kinds of sine wave voltage signals in accordance with rotation of the three-phase brushless DC motor, so that a predetermined phase difference is provided between the two kinds of sine wave voltage signals. In this case, the timing judging means judges the latch timing based on a comparison in largeness between the two kinds of sine wave voltage signals.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Related Background Art

Figure 1:
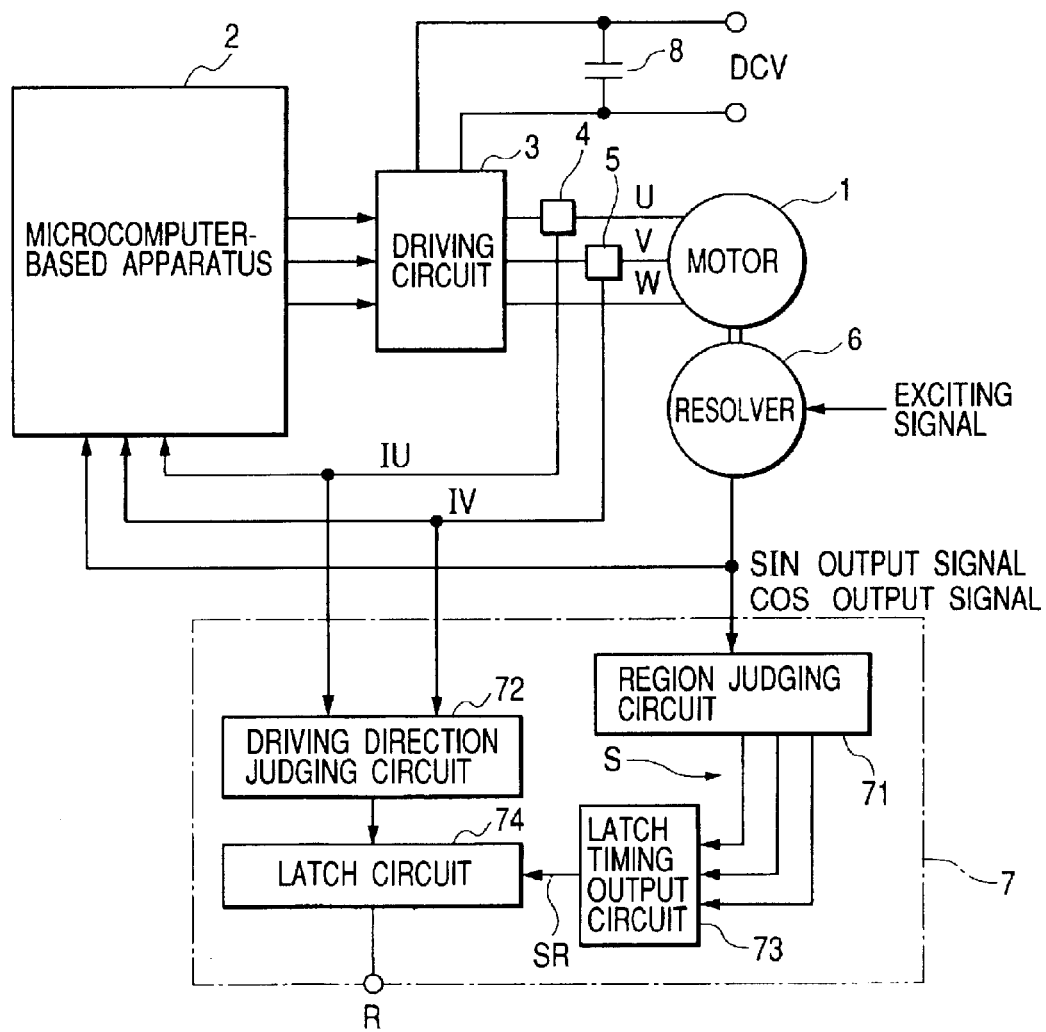
FIG. 1 is a block diagram showing a three-phase brushless DC motor control apparatus in accordance with a preferred embodiment of the present invention.

The applicant has previously proposed an electrically-driven power steering system in an earlier patent application, i.e., in the U.S. patent application Ser. No. 09/928,365, filed on Aug. 14, 2001, to provide a technique for monitoring failure in the DC (i.e., direct-current) motor control CPU without relying on a sub CPU.

However, if this monitoring system is directly used for monitoring the failure of a CPU controlling a three-phase brushless DC motor, it will be definitely necessary to detect an actual rotational direction of a motor. However, detecting the actual rotational direction of the three-phase brushless DC motor is generally not easy.

More specifically, it is impossible to detect an actual rotational direction based on three-phase AC (i.e., alternating-current) currents supplied to a three-phase brushless DC motor. Therefore, to obtain the actual rotational direction based on an electric amount obtained from an existing electric circuit, it is necessary to perform a three-phase to two-phase conversion to obtain a q-axis current and then calculate the rotational direction based on the obtained q-axis current. However, this kind of detecting method based on circuit parameters inevitably requires the process of complicated three-phase to two-phase conversion. The control section must be equipped with a three-phase to two-phase conversion circuit beforehand, or the motor control CPU itself needs to perform the three-phase to two-phase conversion processing. A great amount of circuit and/or software burden will be imparted on a three-phase brushless DC motor system when it inherently does not possess the capability of performing the three-phase to two-phase conversion.

It is also possible to install a rotary encoder having the capability of detecting the actual rotation of a three-phase brushless DC motor. However, the motor system will become complicated in arrangement and expensive in cost, and accordingly cannot be practically used.

To solve this problem, the present invention provides a rotational direction detecting apparatus for a three-phase brushless DC motor, as disclosed and supported by a later-described embodiment.

Characteristic Features of the Invention

The following is the characteristic features of the present invention.

The reference numerals in parentheses attached hereinafter show the correspondence between the characteristic features of the present invention and the practical components or portions in the preferred embodiment.

According to the present invention, current sensors (4, 5) are provided for detecting current values flowing across two of three-phase windings of the three-phase brushless DC motor. A comparing means (72) is provided for comparing two current values detected by the current sensors. A rotational angle detecting means is provided for outputting a signal representing a rotational angle of the three-phase brushless DC motor. A timing judging means (73) is provided for judging a latch timing based on the rotational angle detected by the rotational angle detecting means so that the compared result produced from the comparing means reflects a correct rotational direction. And, a latch means (74) is provided for inputting the compared result obtained from the compared means at the designated optimum latch timing based on the output signal of the timing judging means as a signal representing a rotational direction of the three-phase brushless DC motor, and for retaining the detected rotational direction until the next latch timing comes.

Namely, the rotational direction detecting apparatus for a three-phase brushless DC motor in accordance with the present invention obtains an optimum latch timing based on an electric angle of a three-phase brushless DC motor based on an output signal of a rotational angle sensor, and compares a pair of phase currents in largeness at the obtained optimum latch timing to detect an actual rotational direction. The detected result is retained until the next optimum latch timing comes. Accordingly, the rotational direction is accurately and simply detectable with reference to a comparison in largeness between two-phase currents. The judgement result is held until the next optimum timing for high-accurate rotational direction judgement comes. This makes it possible to know the rotational direction even during a judgement unsuitable duration which inevitably resides when the rotational direction judgement is performed based on the comparison in largeness between two phase currents. Furthermore, the rotational direction detecting apparatus for a three-phase brushless DC motor of this invention can be constituted by using a simple circuit and therefore has excellent usability.

Preferably, the rotational angle detecting means of the present invention includes a resolver (6) generating two kinds of sine wave voltage signals in accordance with rotation of the three-phase brushless DC motor, so that a predetermined phase difference is provided between these sine wave voltage signals. And, the timing judging means judges the latch timing based on a comparison in largeness between these sine wave voltage signals. This is advantageous in that a general purpose resolver is usable for realizing the high-accurate judgement of the rotational direction.

A Practical Embodiment

A practical embodiment of the present invention will be explained hereinafter with reference to attached drawings. Identical parts are denoted by the same reference numerals throughout the drawings.

A control apparatus for a three-phase brushless DC motor in accordance with a preferred embodiment of the present invention is, for example, usable as a three-phase brushless DC motor control apparatus for a motor-driven power steering device.

Circuit Arrangement

FIG. 1 is a block diagram showing a three-phase brushless DC motor control apparatus in accordance with a preferred embodiment of the present invention.

The three-phase brushless DC motor control apparatus includes a three-phase brushless DC (direct-current) motor 1, a microcomputer-based controller 2 (which is simply referred to as CPU, hereinafter) for controlling the three-phase brushless DC motor 1, a three-phase inverter circuit 3 which serves as a driving circuit of the three-phase brushless DC 1, a pair of current sensors 4 and 5, a resolver 6, an actual rotational direction detecting circuit 7, and a smoothing capacitor 8.

CPU 2 outputs three-phase gate control voltage signals for controlling the three-phase inverter circuit 3. The three-phase inverter circuit 3 produces three-phase AC (alternating-current) voltages based on three-phase gate control voltage signals entered from CPU2. The three-phase AC voltages are applied to the three-phase brushless DC motor 1. The three-phase inverter circuit 3 has an ordinary circuit arrangement and therefore operates in an ordinary manner. Thus, detailed explanation for the three-phase inverter circuit 3 is omitted here.

The current sensors 4 and 5 detect two of the three-phase AC currents flowing across the three-phase windings of the three-phase brushless DC motor 1 supplied from the three-phase inverter circuit 3. The detected two-phase AC current values are sent to CPU 2. As is well-known, CPU 2 adds the entered two-phase AC current values and inverts the summed-up result to calculate the remaining one phase current value, thereby obtaining all of the three-phase AC current values flowing across the three-phase windings of the three-phase brushless DC motor 1.

The resolver 6 includes an exciting winding which is wound around a rotor fixed to a rotational shaft of the three-phase brushless DC motor 1. A sine wave exciting voltage $V \sin \omega t$ is applied to the exciting winding of the resolver 6. The resolver 6 further includes a pair of output windings which are wound around a stator and mutually spaced by an electric angle $\theta = \pi/2$. These output windings produce, as a pair of output voltage signals, a SIN output voltage signal and a COS output voltage signal. The SIN output voltage signal is expressed by $Vm \sin \omega t \times \sin \theta$ and the COS output voltage signal is expressed by $Vm \sin \omega t \times \cos \theta$, where Vm represents a maximum value of the amplitude. When the maximum amplitude Vm is 1, the SIN output voltage signal is referred to as SIN output signal ($=\sin \omega t \times \sin \theta$) while the COS output voltage signal is referred to as COS output signal ($=\sin \omega t \times \cos \theta$). Similarly, in the sine wave exciting voltage $V \sin \omega t$, when the maximum amplitude V is 1, the sine wave exciting voltage $V \sin \omega t$ becomes $\sin \omega t$. This is referred to as an exciting signal.

The actual rotational direction detecting circuit 7 includes a region judging circuit 71, a driving direction judging circuit 72, a latch timing output circuit 73, and a latch circuit 74, which are later explained in detail.

The microcomputer-based controller (i.e., CPU) 2 inputs two-phase currents measured by the current sensors 4 and 5 and forms the remaining one-phase current based on the entered two-phase currents. Then, CPU 2 determines the largeness and timing for each of a total of six three-phase gate voltage signals to be supplied to the three-phase inverter circuit 3 based on the three-phase currents thus obtained, a rotational angle signal entered from the resolver 6, and a command signal entered from the outside. The three-phase inverter circuit 3 controls the driving operation of the three-phase brushless DC motor 1. The driving control itself for this kind of three-phase brushless DC motor 1 and its various modifications are well known in the art and therefore will not be explained hereinafter. The microcomputer-based controller (i.e., CPU) 2 can be constituted by using a hardware logic circuit or a digital signal processor dedicated to this system.

Operation

The actual rotational direction detecting operation in accordance with this embodiment will be explained hereinafter.

Region Judging Circuit 71

Figure 2A:
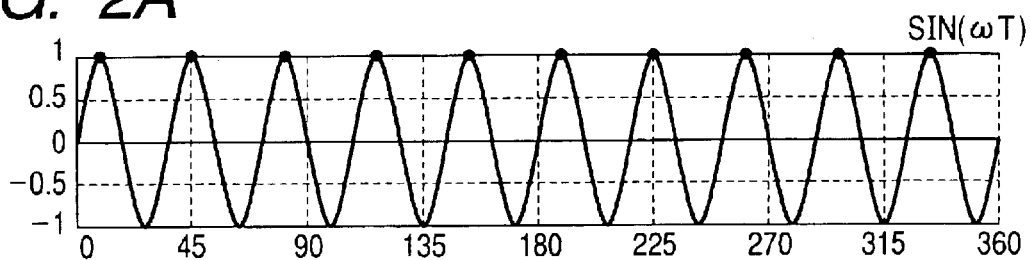
FIGS. 2A to 2D are timing charts showing the waveforms of various portions of a resolver shown in FIG. 1.
Figure 2B:
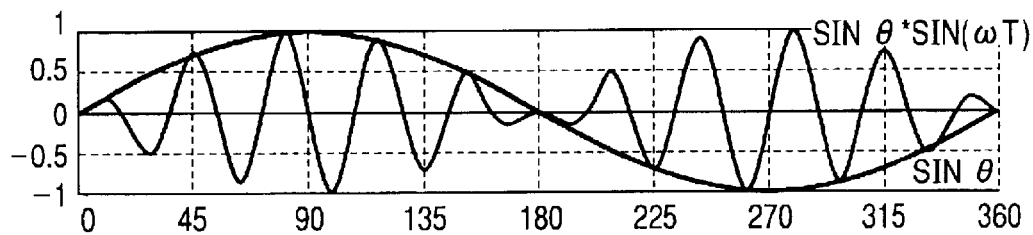
Figure 2C:
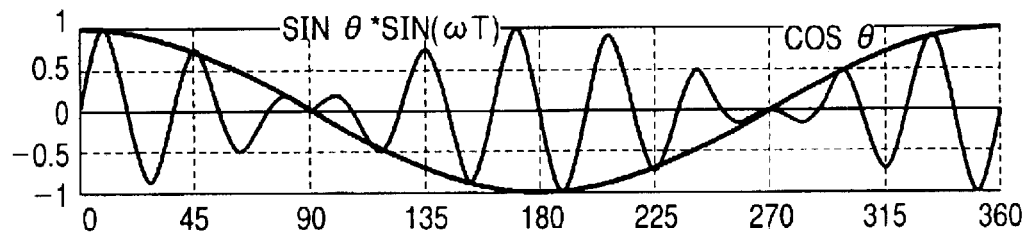
Figure 2C:

FIGS. 2A, 2B and 2C are waveforms at various portions in the resolver 6, showing the exciting signal sin ωt, the SIN output signal sin ωt×sin θ, and the COS output signal sin ωt×cos θ, respectively. The electric angle 2π term of the three-phase brushless DC motor 1 can be dissected into a total of eight electric angle regions (i.e., phase terms) T1 to T8, each having an electric angle of 45°.

The following is the relationship in largeness of amplitude between the SIN output signal and the COS output signal in each of the dissected electric angle regions (i.e., phase terms) T1 to T8.

TABLE 1

REGION T1 SIN output signal ≧0 & COS output signal >0 & | SIN output signal | < | COS output signal |
REGION T2 SIN output signal >0 & COS output signal ≧0 & | SIN output signal | ≧ | COS output signal |
REGION T3 SIN output signal >0 & COS output signal ≦0 & | SIN output signal | > | COS output signal |
REGION T4 SIN output signal ≧0 & COS output signal <0 & | SIN output signal | ≦ | COS output signal |
REGION T5 SIN output signal ≦0 & COS output signal <0 & | SIN output signal | < | COS output signal |
REGION T6 SIN output signal <0 & COS output signal ≧0 & | SIN output signal | ≦ |COS output signal |
REGION T7 SIN output signal <0 & COS output signal ≧0 & | SIN output signal | > | COS output signal |
REGION T8 SIN output signal ≦0 & COS output signal >0 & | SIN output signal | ≦ | COS output signal |

As understood from the foregoing, at the timing where the momentary value of the exciting signal sin ωt becomes 1, the SIN output signal sin ωt×sin θ becomes sin θ and the COS output signal sin ωt×cos θ becomes cos θ.

Figure 2D:
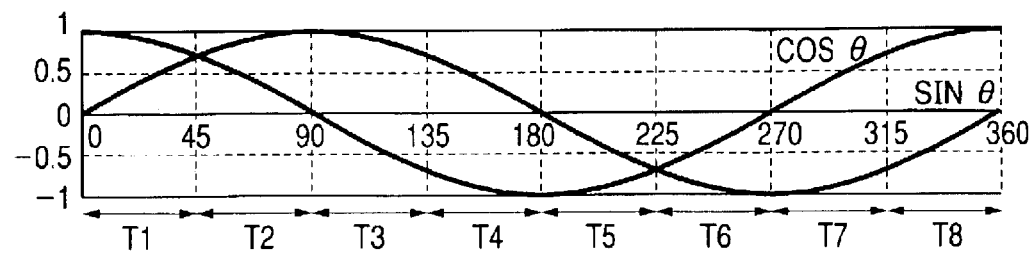

FIG. 2D shows the SIN output signal sin θ and the COS output signal cos θ sampled at the timings where the momentary value of the exciting signal sin ωt becomes 1.

Each of the dissected electric angle regions (i.e., phase terms) T1 to T8 has different data pair with respect to the combination of the SIN output signal sin θ and the COS output signal cos θ. In other words, it is possible to accurately identify each of the dissected electric angle regions (i.e., phase terms) T1 to T8 based on the data pair of the SIN output signal sin θ and the COS output signal cos θ. The region judging circuit 71 performs the above processing for identifying each of dissected electric angle regions (i.e., phase terms) T1 to T8.

Accordingly, the region judging circuit 71 is a logic circuit which inputs the SIN output signal sin θ and the COS output signal cos θ from the resolver 6 and identifies each of the dissected electric angle regions (i.e., phase terms) T1 to T8 based on the entered data pair of the SIN output signal sin θ and the COS output signal cos θ with reference to the above relationship shown in TABLE 1.

More specifically, the region judging circuit 71 includes first and second comparing circuits, a first absolute value forming circuit, a second absolute value forming circuit, an absolute value comparing circuit, and a region judging logic circuit. The first comparing circuit compares the SIN output signal sin θ with a threshold corresponding to its signal value 0 to produce a binary output (i.e., 1 or 0). For example, the first comparing circuit produces a binary output 1 when the SIN output signal sin θ is larger than 0, while the first comparing circuit produces a binary output 0 when the SIN output signal sin θ is smaller than 0. The second comparing circuit compares the COS output signal cos θ with a threshold corresponding to its signal value 0 to produce a binary output (i.e., 1 or 0). For example, the second comparing circuit produces a binary output 1 when the COS output signal cos θ is larger than 0, while the second comparing circuit produces a binary output 0 when the COS output signal cos θ is smaller than 0.

The first absolute value forming circuit forms an absolute value of the SIN output signal sin θ. The second absolute value forming circuit forms an absolute value of the COS output signal cos θ. The absolute value comparing circuit (serving as a third comparing circuit) compares the absolute value of the SIN output signal sin θ obtained by the first absolute value forming circuit with the absolute value of the COS output signal cos θ obtained by the second absolute value forming circuit to produce a binary output (i.e, 1 or 0). For example, the absolute value comparing circuit (i.e., the third comparing circuit) produces a binary output 1 when the absolute value of the SIN output signal sin θ is larger than the absolute value of the COS output signal cos θ, while the absolute value comparing circuit (i.e., the third comparing circuit) produces a binary output 0 when the absolute value of the SIN output signal sin θ is smaller than the absolute value of the COS output signal cos θ, The region judging logic circuit judges or identifies an electric angle region (i.e., phase term) based on logical state of three binary output values obtained from the first to third comparing circuits with reference to the above relationship shown in TABLE 1.

The region judging circuit 71 can be easily constituted by using conventional hardware logic circuits and, therefore, its detailed circuit arrangement is not shown. According to this embodiment, the above-described region judging logic circuit of the region judging circuit 71 produces a 3-bit digital signal whose state value represents or identifies each of the dissected electric angle regions (i.e., phase terms) T1 to T8.

The following is the relationship between the dissected electric angle regions (i.e., phase terms) T1 to T8, their electric angle θ, and a corresponding output signal (i.e., region judging signal) S produced from the region judging circuit 71.

TABLE 2

| dissected regions | electric angle θ (°) | output signal S |
|---|---|---|
| T1 | 0–45 | 0 (=000) |
| T2 | 45–90 | 1 (=001) |
| T3 | 90–135 | 2 (=010) |

TABLE 2-continued

| dissected regions | electric angle θ (°) | output signal S |
|---|---|---|
| T4 | 135–180 | 3 (=011) |
| T5 | 180–225 | 4 (=100) |
| T6 | 225–270 | 5 (=101) |
| T7 | 270–315 | 6 (=110) |
| T8 | 315–360 | 7 (=111) |

Although the output signal S is expressed by a numerical value 0 to 7, a practical signal produced from the region judging circuit 71 is a digital signal of 3 bits representing the above numerical value as indicated by binary data in parentheses in TABLE 2.

Driving Direction Judging Circuit 72

Next, the operation of the driving direction judging circuit 72 will be explained with reference to FIGS. 3A and 3B. The driving direction judging circuit 72 inputs two, i.e., U-phase current IU and V-phase current IV, current signals measured by the current sensors 4 and 5.

Figure 3A:
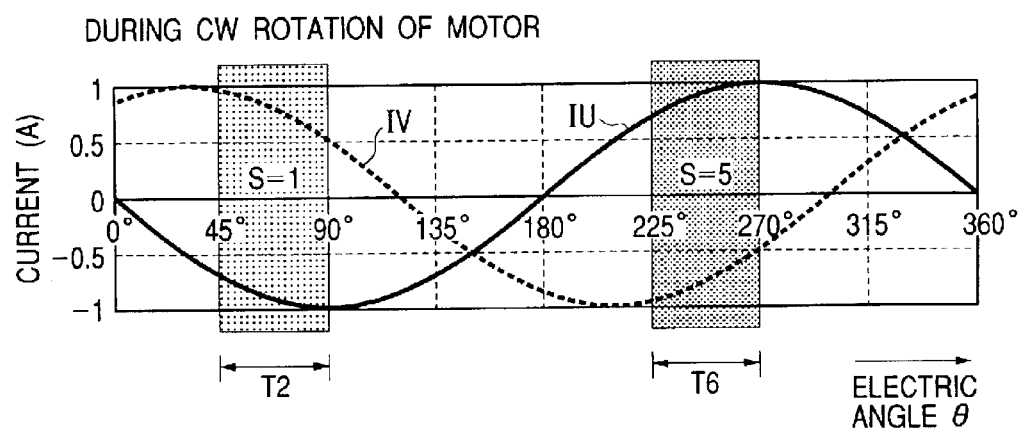
FIGS. 3A and 3B are timing charts showing the waveforms of two output signals measured by two current sensors shown in FIG. 1 together with optimum electric angle regions preferable for the latch operation.

FIG. 3A shows the waveforms of the U-phase current IU and the V-phase current IV when the three-phase brushless DC motor 1 rotates in the clockwise direction (i.e., in the CW direction). FIG. 3B shows the waveforms of the U-phase current IU and the V-phase current IV when the three-phase brushless DC motor 1 rotates in the counterclockwise direction (i.e., in the CCW direction).

Figure 3B:
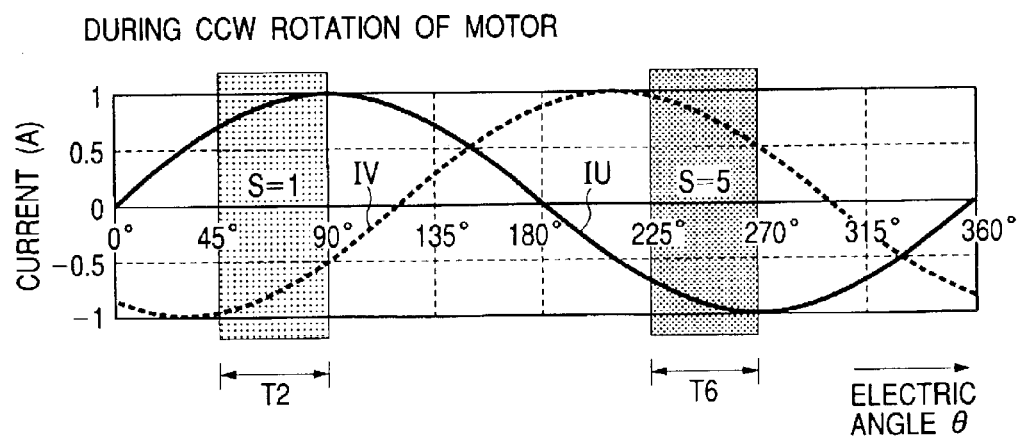

As understood from FIGS. 3A and 3B, when compared between the clockwise (CW) rotation and the counterclockwise (CCW) rotation, the relationship in largeness between the U-phase current IU and the V-phase current IV reverses explicitly in specific electric angle regions. It is hence possible to judge the rotational direction of the three-phase brushless DC motor 1 based on a comparison in largeness between two currents, i.e., U-phase current IU and V-phase current IV, measured by the current sensors 4 and 5 by using a comparator. In this respect, the driving direction judging circuit 72 can be simply constituted by using a single comparator.

For example, in the region T6 ranging from the electric angle 225° to 270° (its output signal S=5), the U-phase current IU is larger than the V-phase current IV during the clockwise (CW) rotation while the U-phase current IU is Furthermore, in the electric angle region T2 ranging from the electric angle 45° to 90° (S=1), the U-phase current IU is smaller than the V-phase current IV during the clockwise (CW) rotation while the U-phase current IU is larger than the V-phase current IV during the counterclockwise (CCW) rotation. Accordingly, it is possible to accurately and simply detect the rotational direction of the three-phase brushless DC motor 1 based on a comparison in largeness between the U-phase current IU and the V-phase current IV in the electric angle region T2 ranging from the electric angle 45° to 90°.

The above-described rotational direction judging operation can be easily performed by using a comparator serving as the driving direction judging circuit 72. For example, this comparator compares a divided voltage of a voltage signal representing the U-phase current IU measured by the current sensor 4 with a divided voltage of a voltage signal representing the V-phase current IV measured by the current sensor 5.

Latch Circuit 74 and Latch Timing Output Circuit 73

The waveform relationship shown in FIGS. 3A and 3B, on the other hand, shows that, in some dissected electric angle regions (i.e., phase terms), there is the difficulty in detecting the rotational direction of the three-phase brushless DC motor based on the comparison in largeness between the U-phase current IU and the V-phase current IV.

Considering this fact, the actual rotational direction detecting circuit 7 includes the latch circuit 74 which latches the output signal of the driving direction judging circuit 72 at an optimum latch timing where the digital signal S takes an appropriate value for the judgement of the driving (or rotational) direction. As described above, the digital signal S is produced from the region judging circuit 71 as 3-bit data designating each of the dissected electric angle region T1 to T8. In other words, the latch circuit 74 invalidates the rotational direction judgement performed based on the comparison data obtained in inappropriate dissected electric angle regions. The latch circuit 74 retains the judgement result (R) until the next optimum latch timing comes. Accordingly, the rotational direction of the three-phase brushless DC motor 1 is always detectable direction. As described above, the digital signal S is produced from the region judging circuit 71 as 3-bit data designating each of the dissected electric angle region T1 to T8. In other words, the latch circuit 74 invalidates the rotational direction judgment performed based on the comparison data obtained in inappropriate dissected electric angle regions. The latch circuit 74 retains the judgment result (R) until the next optimum latch timing comes. Accordingly, the rotational direction of the three-phase brushless DC motor 1 is always detectable based on the latch data retained in the latch circuit 74 even in the inappropriate dissected electric angle regions. Thus, there is no dormant period during which the rotational direction of the three-phase brushless DC motor 1 is undetectable.

According to this embodiment, the latch timing output circuit 73 produces a latch timing signal SR of high level (=1) when the region judging signal S produced from the region judging circuit 71 is a 3-bit output signal (001) corresponding to the electric angle region T2. The latch timing output circuit 73 produces a latch timing signal SR of low level (=0) when the region judging signal S produced from the region judging circuit 71 is a 3-bit output signal not corresponding to the electric angle region T2.

The latch timing signal SR produced from the latch timing output circuit 73 is sent to the latch circuit 74. The latch circuit 74 latches the output signal of the driving direction judging circuit 72 during a term where the latch timing signal SR is in the high level (=1) or in response to a rising edge of this term. The output signal produced from the driving direction judging circuit 72 is a 1-bit signal representing the rotational direction of the three-phase brushless DC motor 1. In this manner, this embodiment makes it possible to accurately detect the rotational direction of the three-phase brushless DC motor 1 at an arbitrary timing.

Modified Embodiment

According to the above-described circuit, it is impossible to input the output signal of the driving direction judging circuit 72 into the latch circuit in each of two specific terms where the U-phase current IU and the V-phase current IV are reversed in their largeness. To solve this, it is possible to modify the circuit arrangement in such a manner that the judgement result of driving direction judging circuit 72 is inverted every time or inverted based on the region judging signal S. This makes it possible to perform the rotational direction judgement two times or plural times during the term corresponding to an electric angle of $2\pi$.

Furthermore, the above-described circuit uses the resolver. However, it is possible to use an arbitrary angular detecting device for detecting an electric angle of the three-phase brushless DC motor 1.

What is claimed is:

1. A rotational direction detecting apparatus for a three-phase brushless DC motor, comprising:
   current sensors for detecting current values flowing across two of three-phase windings of the three-phase brushless DC motor,
   comparing means for comparing two current values detected by said current sensors,
   rotational angle detecting means for outputting a signal representing a rotational angle of said three-phase brushless DC motor,
   timing judging means for identifying an optimum latch timing based on said rotational angle detected by said rotational angle detecting means, said optimum latch timing being designated beforehand as assuring that a compared result produced from said comparing means reflects a correct rotational direction of said three-phase brushless DC motor, and
   latch means for inputting said compared result from said comparing means at said designated optimum latch timing identified by said timing judging means, and said latch means retaining the compared result as representing a rotational direction of said three-phase brushless DC motor until the next optimum latch timing inputted.

2. The rotational direction detecting apparatus for a three-phase brushless DC motor in accordance with claim 1, wherein
   said rotational angle detecting means comprises a resolver generating two kinds of sine wave voltage signals in accordance with rotation of said three-phase brushless DC motor, so that a predetermined phase difference is provided between said two kinds of sine wave voltage signals, and
   said timing judging means judges said latch timing based on a comparison of which output of said two kinds of sine wave voltage signals is larger.

* * * * *